(12) United States Patent
Brand

(10) Patent No.: US 6,459,808 B1
(45) Date of Patent: Oct. 1, 2002

(54) METHOD FOR INFERRING TARGET PATHS FROM RELATED CUE PATHS

(75) Inventor: Matthew Brand, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/358,453

(22) Filed: Jul. 21, 1999

(51) Int. Cl.⁷ .................................................. G06K 9/00

(52) U.S. Cl. ...................... 382/155; 382/103; 382/225; 382/232; 382/242; 706/12; 706/20; 706/62

(58) Field of Search .................................. 382/103, 155, 382/165, 225, 232, 242; 706/62, 12, 20

(56) References Cited

U.S. PATENT DOCUMENTS 6,212,510 B1 * 4/2001 Brand .......................... 706/62
6,336,108 B1 * 1/2002 Thiesson et al. .............. 706/20

* cited by examiner

Primary Examiner—Leo Boudreau
Assistant Examiner—Sheela Chawan
(74) Attorney, Agent, or Firm—Dirk Brinkman

(57) ABSTRACT

A method infers a target path in a target system from a cue path. The method learns a target state machine, target probability density functions and an occupancy matrix of the state machine from training target paths. Cue probability density functions are learned from a training cue path and the target occupancy matrix. A cue path is analyzed using the cue probability density functions and the target state machine to produce hidden states of the cue path. The target path is synthesized from the hidden states of the cue path and the target probability density functions.

7 Claims, 8 Drawing Sheets

METHOD FOR INFERRING TARGET PATHS FROM RELATED CUE PATHS

FIELD OF THE INVENTION

This invention relates generally to learning and inference systems, and more particularly to learning and inferring mappings between paths of varying dimensionality.

BACKGROUND OF THE INVENTION

The field of regression (or regression analysis) deals with learning how to predict one thing from another. For example, regression can be used to predict air conditioner sales from daily temperatures.

A regression function maps points in a cue space (a domain) to points in a target space (a range). The spaces can have different but fixed dimensionalities, and the mapping can be quite complicated. Learning means discovering the proper form of the regression function and estimating its parameters. Regression literature dates back hundreds of years. Popular modern regression methods include parametric curve fitting, neural networks, and non-parametric methods such as radial basis function networks.

Often, there is not enough information in a single point to support a good mapping, but in sequential data nearby points often contain information about each other that can be used to complete the mapping. In this case, one may use a fixed-width context window, e.g., to predict today's air conditioner sales from daily temperatures over the last week. This still is a point mapping, but the dimensionality of the domain has increased seven-fold.

There may always be useful information outside the context window. For example, it may help to know the temperature trend over the last few months. Then, one performs two regressions, one that combines the trend with today's reading to make the prediction, and one that uses both inputs to update the trend. Note, both are still point mappings, but by updating the trend, information is carried forward in time. In short, the mapping incorporates foresight. Forward propagation models of this sort include Kalman filters, recurrent neural networks, and tap-delay control systems.

Finally, it may be desired to reconstruct a year's air-conditioning sales from an entire year's worth of temperature readings. Here one might want to use both foresight and hindsight (carrying information backward in time). For example, knowledge of August's temperature readings may be useful in inferring June's sales, because heavy use of many air conditioners can actually raise outdoor temperatures. Inferring one sequence from another is not a point mapping: The sequences have no fixed length so the dimensionality of the regression function is unknown.

Essentially, it is desired to map between paths in the domain and the range. A path is defined as an arbitrarily long sequence of points, where successive points are not entirely unrelated. In statistics, one says that the points are dependent. Kalman filtering (forward propagation) and smoothing (backward propagation) was formulated for this task. However, Kalman models have a serious limitation. The path in the. target space must evolve linearly, and its relationship to the path in the cue space must also be linear.

Extended Kalman filters attempt to relax the linear evolution constraint, but typically lack a smoothing step or a learning procedure. In addition, extended Kalman filters are generally based on linear approximations to a known non-linear evolution function. Linear approximations cause inference to fail to converge or converge incorrectly, in which case learning and prediction can fail.

Therefore, it is desired to provide a method that can infer a target path from a cue path. It is desired that this method should optimize use of hindsight and foresight. It is also desired that the method can handle targets that evolve in a non-linear manner. Furthermore, it is desired that the method handle non-linear relations between cue and target paths. Lastly, it is desired to provide fast learning and inference procedures that are guaranteed to converge.

SUMMARY OF THE INVENTION

Instead of a "trend" variable as in the prior art, the invention uses a discrete vector-valued "hidden state" variable which carries information both forwards and backwards in time. The learning procedure maximizes the information content of the hidden state variable at every time step.

An inference procedure finds globally optimal settings of the hidden state variable for every time step, carrying context from arbitrarily far away in time. Finally, the inferred path value for each time step incorporates information from the setting of the hidden state variable at every step in the time series. Altogether, the invention integrates information along the entire length of the paths, ensuring a globally consistent mapping between paths of varied, arbitrary dimensionality.

More particularly, the invention provides a method that infers a path in a target space from a path in a cue space. The inferred target path is maximally consistent with the cue path and with the known behavior of the target system, as learned from examples in a training phase. The learning procedure estimates a target state machine, target probability density functions (PDFs) and an occupancy matrix of the state machine from training target paths. The target state machine and the target PDFs comprise a hidden Markov model. The learning procedure minimizes entropy in these models.

Cue PDFs are estimated from training cue paths and the target occupancy matrix obtained from training. When mapping, a new cue path is analyzed using the cue PDFs and the target state machine to produce a new cue occupancy matrix. The new target path is synthesized from the cue occupancy matrix and the target PDFs.

DETAILED DESCRIPTION OF THE PREFERRED EMBODIMENT

Figure 1:
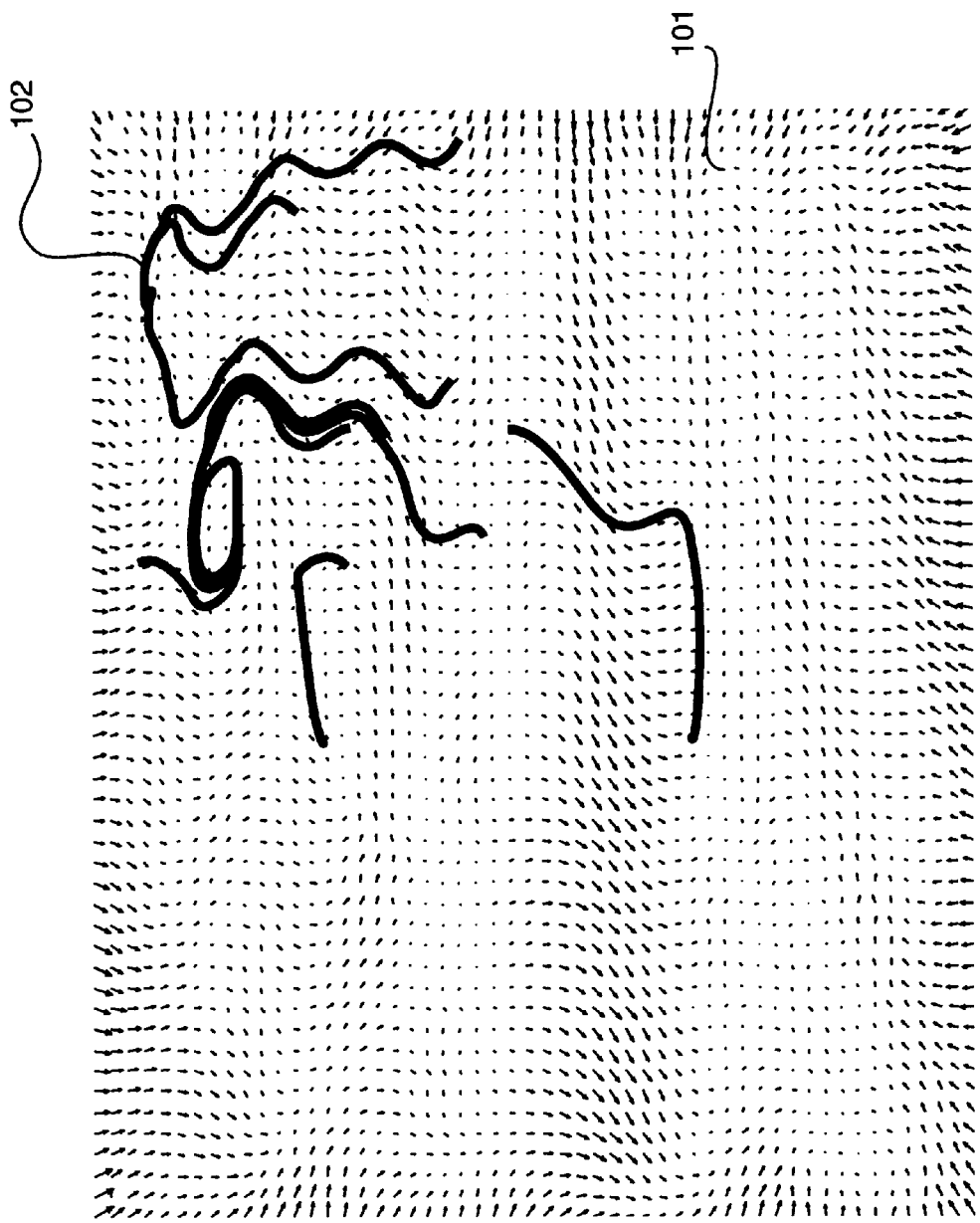
FIG. 1 is a vector field schematic of a 4D dynamic manifold.

I describe a method for inferring a target path from a cue path after a target system has been modeled. A path can be also be referred to as a trajectory, sequence or time-series. As a feature of my invention, the target path can evolve in a non-linear manner, and the target path can have a non-linear relation to the cue path. My inference method searches for a most probable sequence of events that best explains a sequence of observables, using both hindsight and foresight along the length of the sequence. I learn all the relevant knowledge from synchronized observations of the target system and of some cue, i.e., measurements or observations of another system that approximately co-evolves with the target system.

My goal is to model the target system as a dynamical manifold. The model takes the form of a continuous probability distribution function (PDF), estimated from observed target paths. Then, I learn a mapping from paths taken by the cue system to paths over the manifold of the target system. This framework supports traditional tasks such as recognition, classification, and pose estimation, plus a novel task: synthesis.

To solve this mapping problem, conventional regression analysis is not viable because the instantaneous mappings between the two spaces are essentially many-to-many, even with local context. Therefore, it is necessary to learn a function that maps between the two spaces that resolves ambiguities by integrating information over the entire length of the paths.

The basis of this function is a configural and dynamical manifold that summarizes the behavior of the target system. I model this manifold with a hidden Markov model (HMM) having special topological properties that are obtained via entropy minimization. The HMM induces a density space that approximates the geometry of the dynamical manifold. Inference then becomes the matter of solving for the geodesic (shortest path) through the density space (and therefore on the manifold) that best explains the evidence in the cue path.

I give a closed-form maximum a posteriori (MAP) solution for geodesics through the learned target density space. The method according to my invention gives a completely general way to perform inference over time-series. My methods support analysis, recognition, classification, reconstruction, prediction, and synthesis of novel behaviors. In addition, the algorithms are practical: Compute time is linear in the length of the time-series.

In an example application, I infer the articulations of a nonrigid, three-dimensional object from a sequence of two-dimensional images. Specifically, the application infers three-dimensional human body poses from a monocular monochromatic sequence, e.g., a shadow play. However, it should be understood that my method readily accommodates other kinds of cues (e.g., multiple cameras and other sources of evidence such as optical flow or feature tracking), as well as many other applications.

Dynamical Manifolds

A dynamical manifold is a locus of all possible position and velocity configurations of a space. Typically, the manifold is embedded in higher-dimensional measurement spaces. such as images. Actual system histories are paths or trajectories on this manifold. A system describes instances or the behavior of the space over time.

Figure 2:
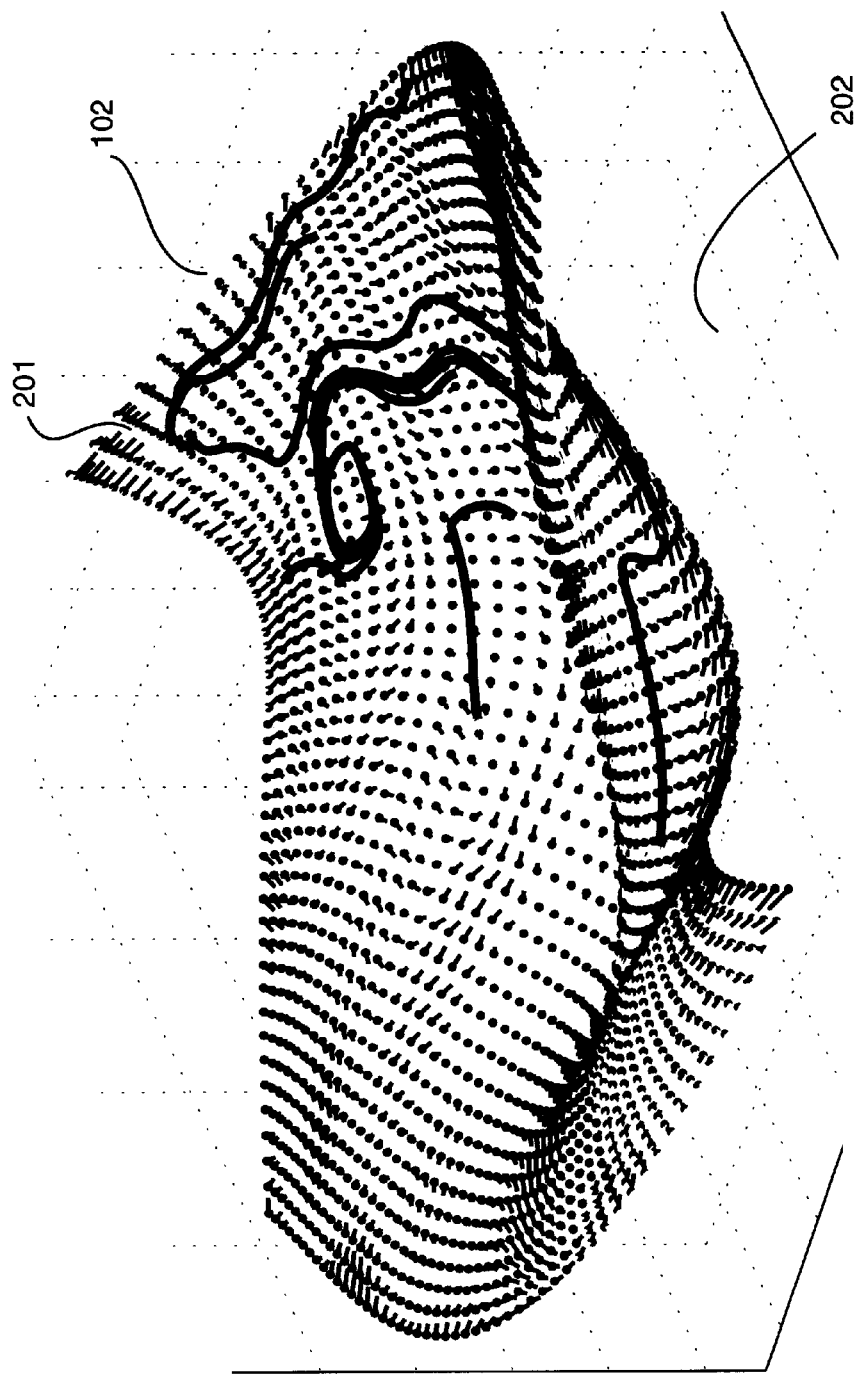
FIG. 2 is a schematic of the manifold embedded in a 6D measurement space.

FIG. 1 shows a 2D vector field schematic 101 of an example 4D dynamic manifold. The arrows indicate the most likely velocity at each position, and the contours 102 signify actual observed system trajectories (paths). FIG. 2 shows the manifold 201 embedded a 6D measurement space 202. More particular, the embeddings is highly non-linear, for example, the manifold curl over and self-intersect. There are insufficient samples on the paths 102 to estimate the global geometry of the manifold, or to estimate a function that might unfurl it.

Figure 3:
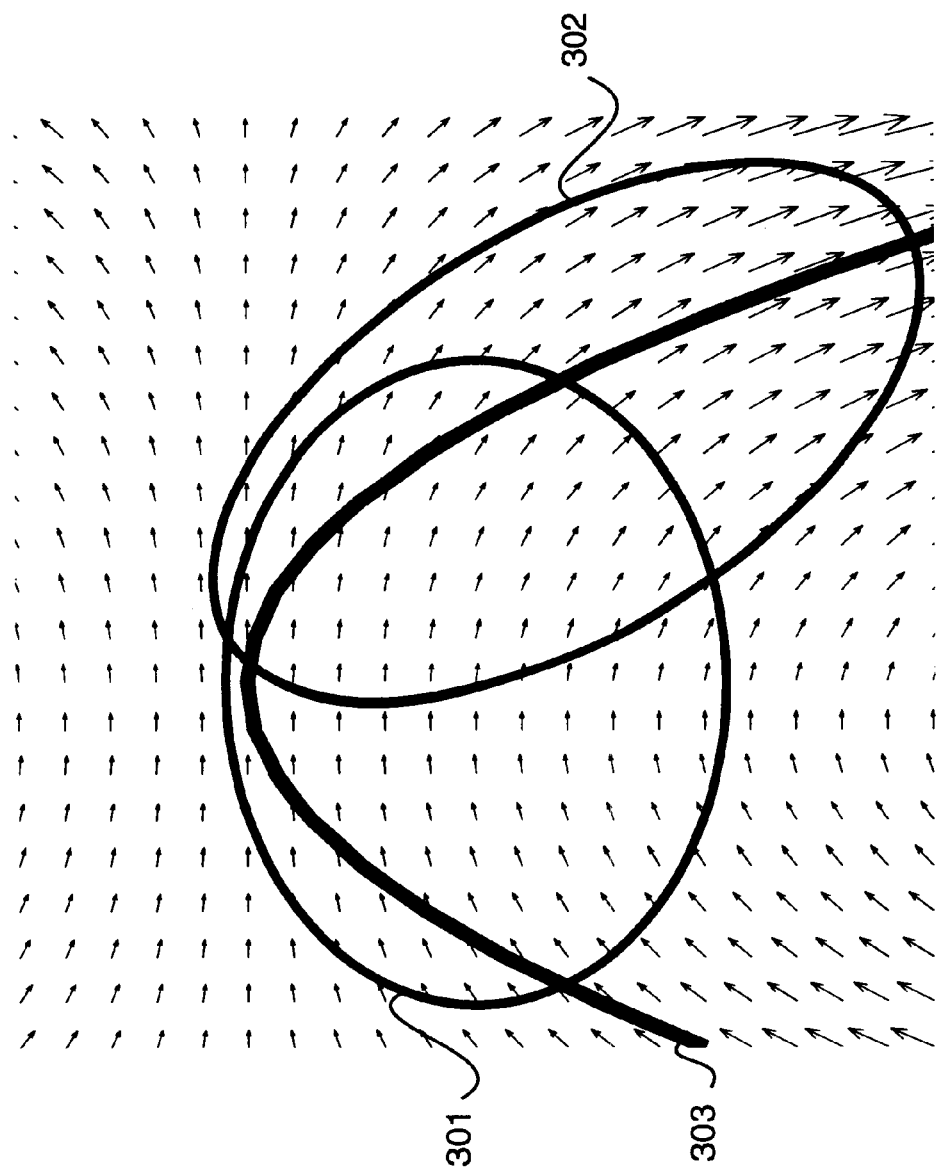
FIG. 3 is a schematic of two neighborhoods with linear covariance of position, and velocity.

FIG. 3 shows two neighborhoods where the velocity covaries linearly with position. The ellipses 301–302 represent iso-density contours of two 4D Gaussian distributions whose positional covariance roughly delineates the two neighborhoods, and whose covariance captures the local relationships of position and velocity. The parabola 303 is an example piecewise quadratic trajectory that is neighborhood consistent.

I model the dynamical manifold by estimating a continuous probability distribution function from observed trajectories. This lends itself immediately to recognition, rediction, and classification tasks, and, importantly, to a degree of extrapolation beyond the training data.

Learning and Inference

Figure 4A:
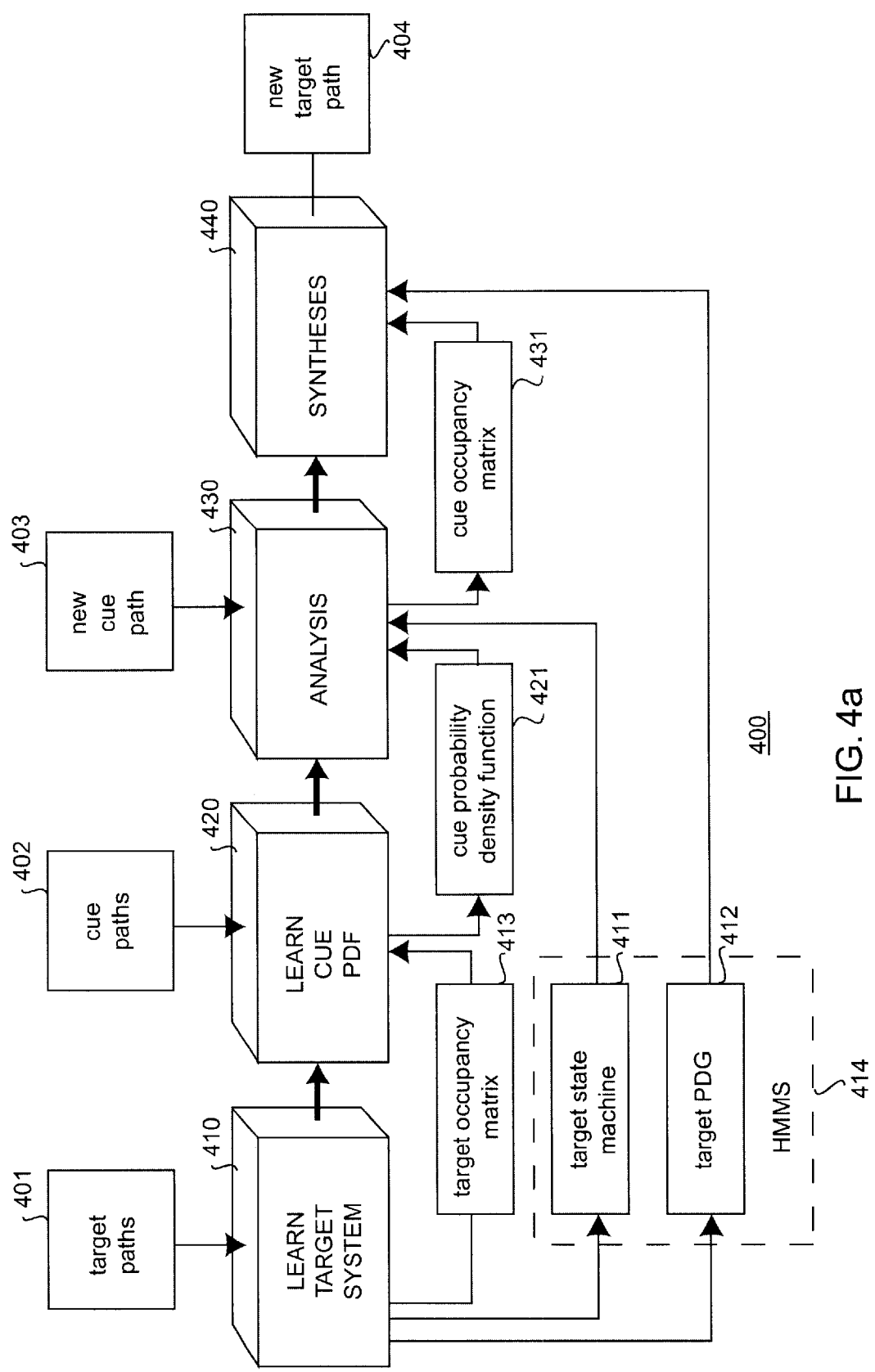
FIG. 4a is a flow diagram of the method according to the invention.
Figure 4B:
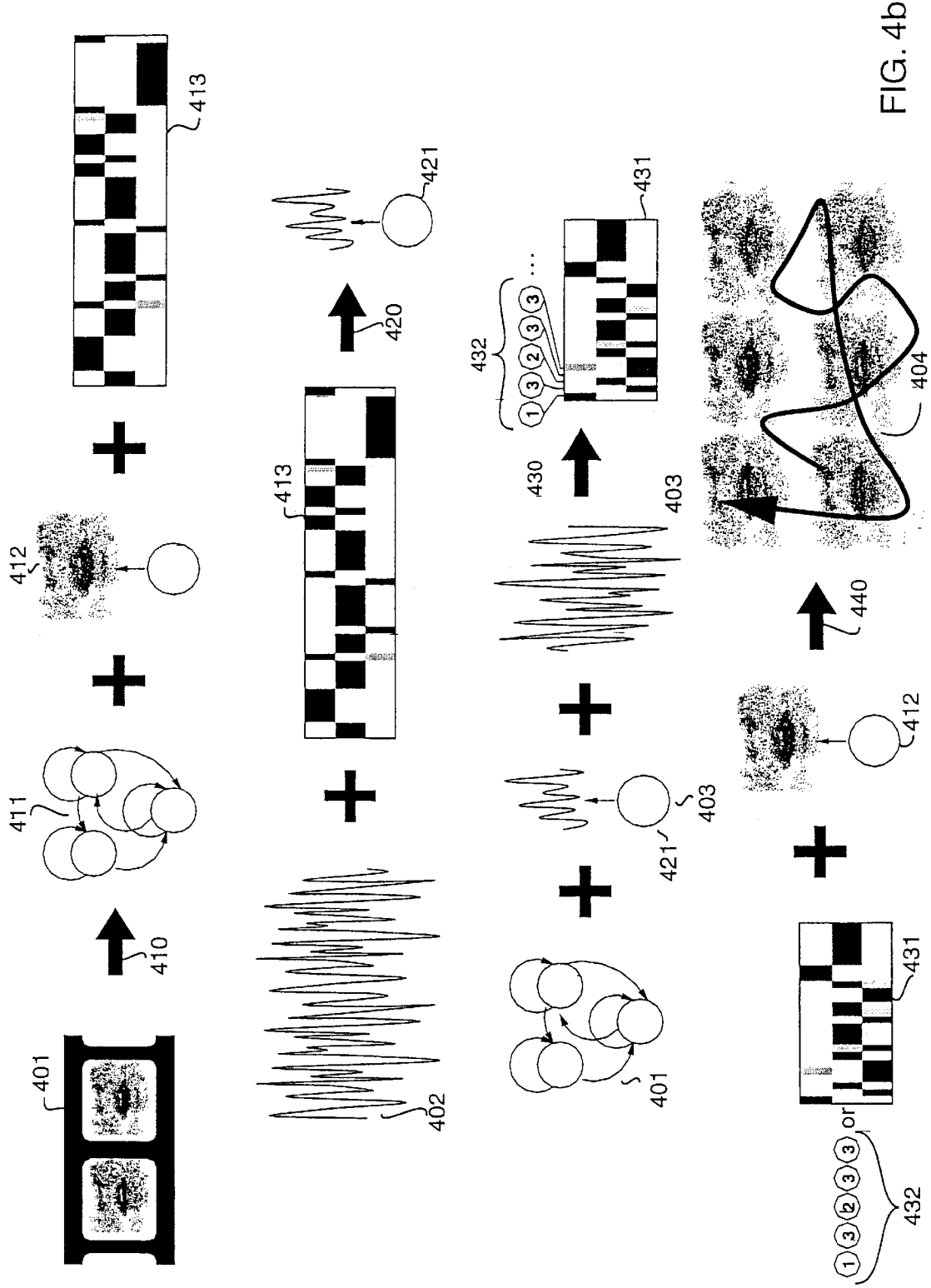
FIG. 4b is a pictorial representation of the method of FIG. 4b.

FIG. 4a shows the steps of a learning and inference process 400 according to my invention, and FIG. 4b shows the process 400 pictorially. The details of the steps are described in detail below. Here, the cue is an audio signal, and the target is synthetic mount posture images. A learning step 410 takes measured or observed target paths 410 (training data) as input. The learning step uses entropy minimization to model a target system from the target paths. The model includes a target state machine 411, target probability density functions 412 for each state, and a target occupancy matrix 413 which describes the states occupied by the machine 411 over time.

The state machine and the PDFs together comprise a hidden Markov model (HMMs) 414 as described below. In the state machine 411, the circles represent possible states, and the arrows transitions. The transitions have associated probabilities, and the states are described by the PDFs 412. In the occupancy matrix 413, the black portions indicate which states are occupied by the machine at any particular time.

Training cue paths 402 that are synchronized with the target paths 401, and the target occupancy matrix 413 are processed in step 420 to learn cue PDFs 421 that correspond to the target PDFs 412.

An analysis step 430 takes as input the target state machine 411, the cue PDFs 421, and a new cue 403. The analysis step can use either forward-backward analysis or Viterbi analysis. In the case of forward-backward analysis the output of the analysis step is a cue occupancy matrix 431, i.e., a description of how probable each state is at each point in the cue path. In the case of Viterbi analysis the output of the analysis step is an optimal state sequence 432, i.e., the sequence of states that best explains the cue path. The cue occupancy matrix 431 or the optimal state sequence 432 generally represent the "hidden" states of the cue path.

A synthesis step 440 takes as input the target PDFs 412 and the cue occupancy matrix 431 to produce a new target path 404 that exhibits behaviors consistent with the target system but "mimics" the new cue path. A slightly faster alternative uses the Viterbi state sequence 432 and, in the case of entropy-minimized models, yields substantially identical results, since both represent the hidden states of the cue path.

Manifold Representation

The learning algorithm identifies neighborhoods in the target manifold where the relationship of position to velocity is roughly linear. I represent each neighborhood with a multivariate Gaussian distribution over target measurements and their deltas (velocities). As FIG. 3 shows, the linearized neighborhoods can describe highly curved system behavior. The Gaussian PDFs are essentially local regression functions for each neighborhood. The learning algorithm joins these fittings together probabilistically into a smoothly-interpolating piecewise linear approximation expressed as a covariance matrix.

The covariance matrix does a double service, it specifies how position and velocity covary, and, implicitly, the covariance matrix specifies neighborhood extent and blending functions. This approach to piecewise linear approximation is simpler than what has been proposed in the prior art. In addition, the approximation leads to a closed-form solutions for all quantities of interest.

Because the manifold is dynamic, the "glue" that joins neighborhoods indicates how quickly the system passes from neighborhood to neighborhood. I express this conveniently as a matrix of transition probabilities.

This manifold approximation is essentially a hidden Markov model, and a transition topology specially matched to the dynamic structure of the manifold. In the HMM, each discrete symbol is replaced by a neighborhood Gaussian distribution function that is the output of a hidden state.

However, estimated hidden Markov models are typically very poor models because conventional training techniques are extremely suboptimal with regard to placement of the outputs of the Gaussian distributions, that is, the discovery of neighborhoods. Moreover, traditional hidden Markov models rarely improve on the modeler's nearly-blind guess about connectivity, e.g., a full transition matrix will let every neighborhood pass directly to every other neighborhood, almost certainly violating the manifold's topology. No modeler would expect a random walk on an estimated hidden Markov model to have the same long-term structure as the time-series in the training set. Yet, that is a property that I require of good manifold models.

To overcome this problem, I use a learning procedure based on entropy minimization, described in greater detail below. This fast, monotonically-improving procedure produces highly structured and accurate models that are largely free of over-fitting. Entropy minimization shifts the Gaussian distributions to neighborhoods of narrow covariance where linear relations between dimensions tend to be stronger. This minimizes overlap of the neighborhoods, and restructures the transition matrix to reflect the qualitative topology of the manifold.

With some additional estimation, I use these models to infer a hidden state in the target system from clues contained in another co-evolving cue path, as described below. For example, I infer the 3D orientation of a body from a sequence of 2D silhouettes.

My method optimally integrates information over time. Where necessary, the method can use clues from either end of the path to disambiguate mappings at the other end. From there I synthesize actual paths that are maximally faithful to both the target system and to the observed evidence. In particular, I give a closed-form solution for the most probable trajectory on the dynamical manifold given a time-series of the co-evolving cue path, as described below. This works even when the target system is more complex and exhibits behaviors not found in the cue system.

Altogether this method yields a general framework for learning functions that map between paths, in contrast to the classic regression task of learning mappings between points. The method according to my invention provides path-consistent inference and the full use of context along the cue path to resolve ambiguities at any point. In the example application, I incorporate some visually important invariances and show how to synthesize 3D animations from a 2D monocular image sequence.

Learning by Entropy Estimation

My learning method is an extension of the method set out in U.S. patent application Ser. No. 08/994,533, filed Dec. 19, 1997, and incorporated herein by reference. I begin with a training data set X 401, and a hidden-variable probabilistic model whose structure and parameters are specified by the matrix θ. In conventional training, one usually guesses a sparsity structure of θ in advance, and merely re-estimates non-zero parameters to maximize the likelihood P(X|θ).

In entropic estimation, I simultaneously learn the size, sparsity structure, and parameter values of θ by minimizing three entropies:

$$\theta^* = \underset{\theta}{\operatorname{argmin}}[H(\omega) + D(\omega\|\theta) + H(\theta)],$$

where H(θ) is the entropy of the expected sufficient statistics of the data set X and can be interpreted as the expected cost of coding the data relative to the model. The value D(ω∥θ) is the cross-entropy between the sufficient statistics and the model. The cross-entropy measures the expected cost of coding aspects of the data set not captured by the model. The value H(ω) is an entropy measure on the model itself. This entropy can be interpreted either as the entropy of the distribution, or the expected coding costs of the model itself.

Minimizing the three entropies is equivalent to maximizing the Bayesian posterior probability with an entropic prior probability. Given a factorizable model, such as a hidden Markov model, the maximum a posteriori problem (MAP) decomposes into a separate component formulation $\theta_i$ for each independent parameter $\theta_i \epsilon \theta$. If the likelihood function P(X|θ) is factorable, then each factor has its own entropic prior probability.

Therefore, iterative MAP estimation minimizes the expected coding length associated with each factor of the likelihood function. Minimizing the entropy sharpens each of these component distributions, which has the effect of sparsifying both the parameter vector and the expected sufficient statistics that describe the data set. This avoids approximations and paradoxes that arise from parameter-counting heuristics in the literature of learning under minimum coding length constraints. Sparse models are desirable because they are resistant to overfitting. When the models have sufficiently low entropy, the models can be interpreted as explanations of the observed data set X, rather than mere fittings.

Iterative MAP re-estimation gradually extinguishes excess parameters and maximizes the information content of the surviving parameters. It is also possible to speed up parameter extinction by trimming (zeroing) parameters when the gain of the prior probability exceeds the loss in the likelihood. For the basic entropic prior, this is easily detected when $\partial H(\theta)/\partial\theta_i > \partial P(X|\theta)/\partial\theta_i$, or when a parameter influences the uncertainty of the model more than the fit.

Starting with a random over-complete model that contains an exponential number of embedded sub-models, entropic minimization whittles away components of the model that are not in accord with the hidden structure of the data set. This allows me to learn the proper size and sparsity structure of the model. Note, there is no "correct" number of states for a continuous signal. If there are insufficient data to support many states, then some will be automatically removed. Entropic estimation of HMMs recovers a finite-state machine substantially close to the data-generating mechanism.

Figure 6:
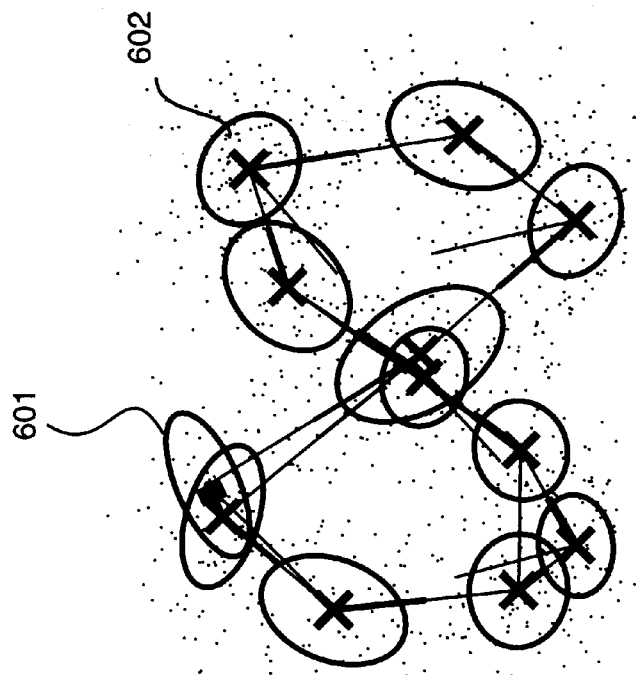
FIG. 6 diagrams an HMM estimated conventionally from the same data as in FIG. 5.
Figure 5:
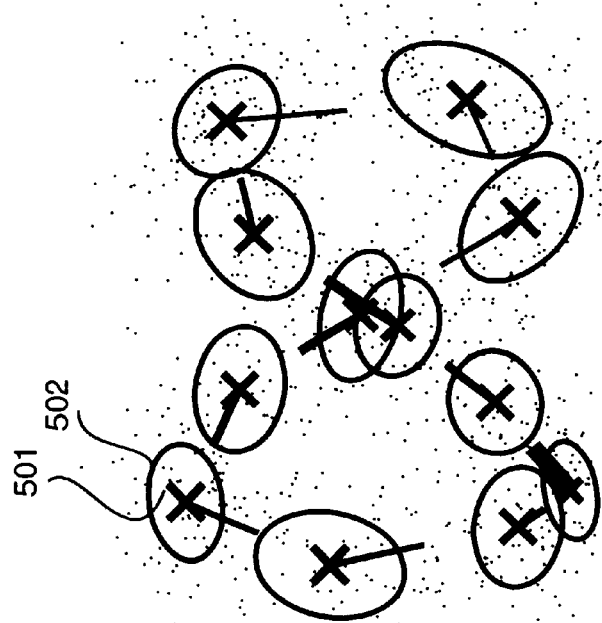
FIG. 5 diagrams an HMM estimated entropically according to the invention.

FIG. 5 shows HMM that are estimated entropically according to the invention. FIG. 6 shows HMM that estimated conventionally by specified by the matrix θ. In conventional training, the sparsity structure is guessed in advance. Both sets of models are estimated from identical initial conditions, and projected onto {x,y} figure-eight training data (dots). Each cross 501, 601 and ellipse 502, 602 indicates a Gaussian mean and covariance of a hidden state, i.e., a neighborhood. The half-arcs point to transitionable states.

Figure 7:
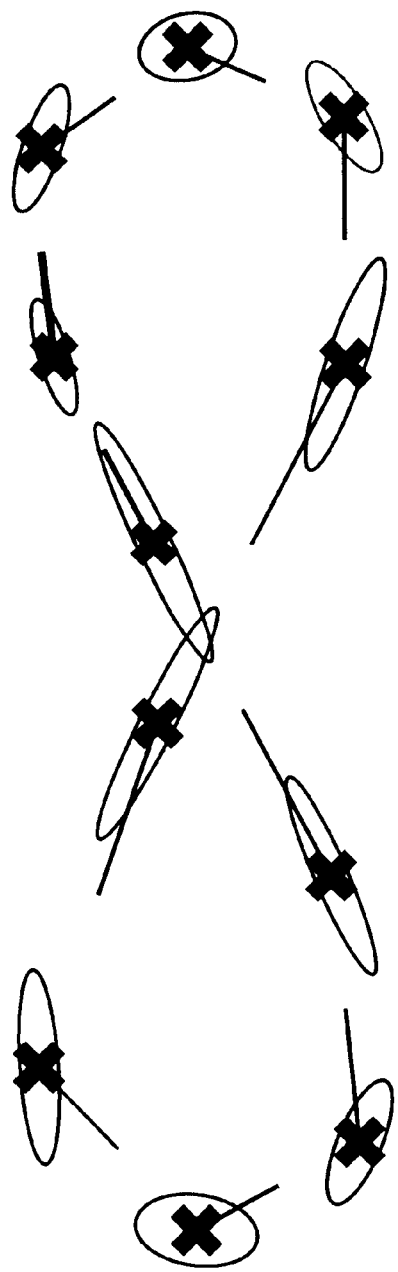
FIG. 7 diagrams another HMM estimated from noisy samples.

FIG. 7 shows HMMs estimated from very noisy samples of a system that orbits in a figure-eight. The true system is a 2D manifold, i.e., phase and its rate of change, embedded in a 4D measurement space, i.e., observed 2D position and velocity. The HMM approximates this manifold with neighborhoods of locally consistent curvature in which velocity covaries linearly with position.

Note, even though the data are noisy and have a continuation ambiguity at the crossing of the figure-eight, the entropically estimated HMM recovers the deterministic structure of the system. A conventionally estimated HMM gets "lost" at the crossing, bunching states at and after the ambiguity and leaving many of them incorrectly overconnected, thus allowing multiple circuits and reversals on either loop as well as numerous small circuits on the crossing and on the lobes. It is the additional precision of entropic HMM models that makes them viable as manifold models.

Observing Cue Paths

After the hidden Markov model is trained, I can associate features of the cue path 402 with neighborhoods, i.e., hidden states 412 of the target manifold modeled as entropic HMMs 414. Forward and backward analysis of time-series sampled from the target system gives me the training occupancy matrix 413. Using this, I estimate a second set of means and covariances as output, such that each HMM state also observes the synchronized time-series sampled from the cue path. This effectively produces a new HMM that has the dynamics of the target system but is driven by the cue.

Analysis

Given the new cue path 403, I can apply a Viterbi procedure to the cue HMM to find the most likely sequence of hidden states of the target system.

It should be noted that the number of possible state sequences in HMMs is exponential in the number of time steps, and that the Viterbi sequence, while most likely, may only represent a small fraction of the total probability mass. For example, there may be billions of slightly different state sequences that are nearly as likely. If this were the case, then the Viterbi sequence would be a very poor representation of the cue, and any subsequent calculations would suffer.

One may also use forward-backward analysis to obtain a new occupancy matrix that includes all information that the HMM can extract from the cue path, since it integrates over all possible sequences. However, this is generally not necessary with entropically estimated models because entropy minimization concentrates the probability mass on the Viterbi sequence.

Synthesis of Target Path

For inference, I seek a short, smooth trajectory (path) that passes through regions of high probability density in the target system at the right time, i.e., a constrained geodesic. Prior approaches to geodesics in density spaces typically involve maximizing an objective function having a likelihood term and penalty terms for excess length. Terms for kinkiness or point dumpiness can also be included. But these methods are fraught with problems and can require much hand-tuning.

By including velocity constraints within the target Gaussian distributions, the geodesic problem is well posed and amenable to a closed-form solution. The result is a smooth trajectory that is most consistent with the dynamics of the target space, and with the state sequence determined from the cue path.

The HMM target Gaussian PDFs, together with hidden state probabilities obtained from forward-backward analysis of the cue $\gamma_{s,t}$ define a mixture of Gaussians over the trajectory-space. I seek the optimal trajectory:

$$Y^* = \mathrm{argmax}_Y p(Y|\gamma_{s,t}).$$

The key step is to use the log-sum inequality to fit a single Gaussian distribution around $p(Y|\gamma_{s,t})$, and to obtain the approximate mean of the posterior probability by LU-decomposing and solving the resulting system of linear equations.

The probability of this approximate solution lower-bounds the probability of the true solution. The bound tightens as the entropy $H(\gamma_{s,t})$ approaches zero. As the Gaussian mixture becomes sparse, a single Gaussian PDF dominates each time frame. At $H(\gamma_{s,t})=0$, the hidden state probability p(Y|Z) is a single Gaussian; so the bound and its solution are both exact. Entropy minimization concentrates the probability mass on the Viterbi sequence, so that $H(\gamma_{s,t}) \approx 0$. Typically the approximate posterior mean solution is superior to the Viterbi solution; the better the manifold model, the smaller the difference.

Figure 8:
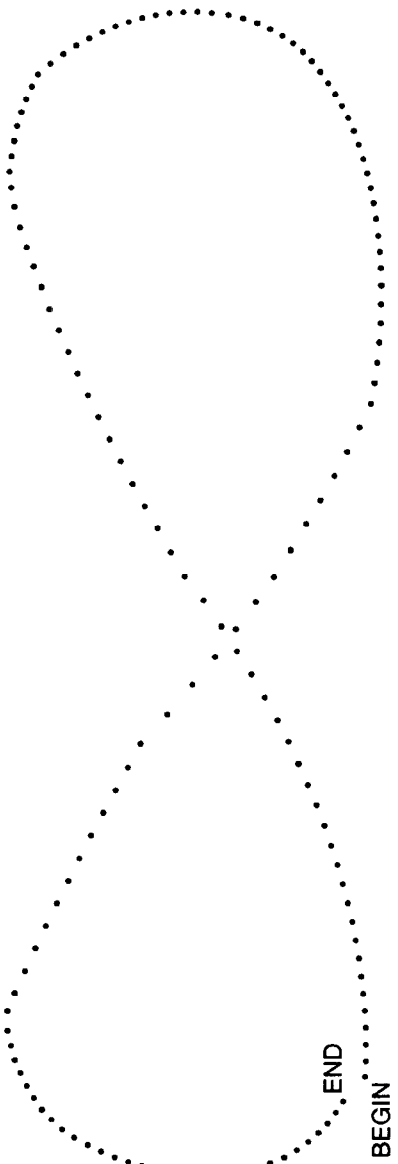
FIG. 8 shows a figure-eight trajectory synthesized from the low-entropy model in FIG. 7.

FIG. 8 shows a geodesic trajectory generated by a random walk on the hidden states of the HMM in FIG. 7. Irregularities are largely due to variations between state dwell-times in the random walk. This demonstrates the claim that a random walk on an entropically estimated model does indeed have the long-term structure of the true system.

Vision Application

In the prior art, 3D pose recovery was originally approached as model-fitting through time. With the advent of video frame-rate computing, pose recovery has evolved into model-guided tracking. Prior art recovery systems usually assume a carefully constructed kinematic model with reduced degrees of freedom and a favorable initialization. Most contend with singularities, costly per-frame optimizations, and potentially troublesome Taylor-series approximations.

Some high-quality results have been obtained from short sequences, but it is worth noting that these methods are incremental and require high-resolution images. A bad image or pose estimate can affect all later estimates, and there is no use of hindsight to correct early estimates. In addition, multiple camera views are usually needed to calculate depth and to resolve occlusions. One model-free alternative uses small concatenations of observed 3D poses as a linear basis set for "unprojecting" 2D tracking data.

Synthesis from Image Sequences

In my example application, a 3D pose of a body is inferred a from a noisy low-resolution silhouette sequences of the sort obtained via foreground extraction. This is rather more difficult than inferring 3D from 2D tracking data because silhouettes are inherently less informative and considerably more ambiguous. On the other hand, silhouettes can be more reliably computed over long time spans. My method can handle the additional noise and ambiguity by integrating evidence forwards and backwards over time.

Figure 9:
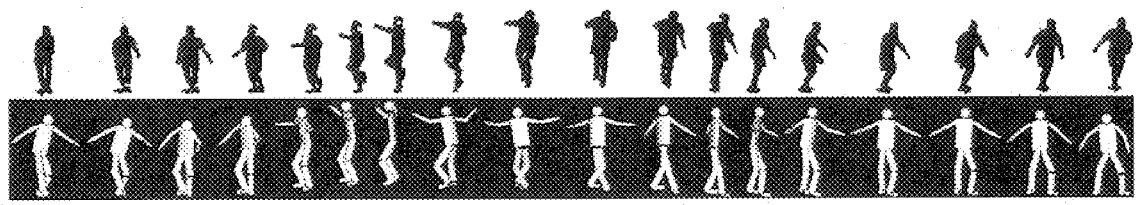
FIG. 9 is a 2D a jump-and-twirl-360° sequence and the corresponding 3D poses.
Figure 10:
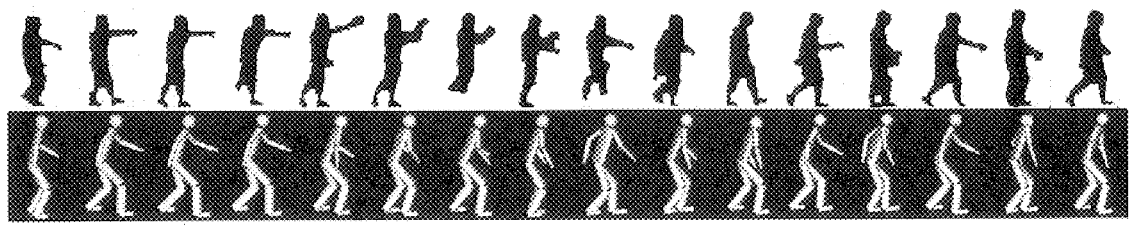
FIG. 10 is a 2D a grab-and-stroll sequence and the corresponding poses.

The input is a monocular monochromatic silhouette sequence as shown in the top of FIGS. 9 and 10. However it should be understood, the sequence can be any informative image representation. The output is the 3D sequence whose projections best explain the input and whose poses and motions are most consistent with the behavior seen in the training set, as shown in the bottom of FIGS. 9 and 10. The frames in FIG. 9 are from a jump-and-twirl-360° sequence. The frames in FIG. 10 are from a grab-and-stroll sequence. In both examples, the inferred 3D sequence is qualitatively correct.

Each profile-view silhouette in sequences has one or more independent ambiguities, for example, which arm or leg is foreground or forward. Periodically, limbs disappear in occlusions. In addition, limbs are amputated in many frames due to back-subtraction errors and erosions. In both sequences the figure is less than 70 pixels high with limbs as narrow as 2 pixels. It would be extremely difficult, if not impossible, to extract fully articulated 3D from these shadow sequences using prior art techniques. Moreover, the raw images from the "twirl" sequence in FIG. 9 are too low-resolution and fast-changing for prior art tracking-based techniques to succeed.

As a Bayesian inference, the output is a blend of prior experience (training) and present evidence, not a metric pose recovery—though the results can be quite close to metric given a reasonably large training set that adequately spans the space of body motions. The method according to the invention obtains reasonable results even with a very small data set of highly atypical motions and poses.

During processing of the images, I remove variations due to whole-body translation, rotation, and scale changes. I estimate a manifold-approximating HMM as described above. The HMM is initialized with all states fully connected, and random parameter values are assigned. Training removed roughly 90% of the transitions. The internal Markov model has an entropy rate of 0.4941 and a perplexity, i.e., average branching factor of 1.6391. This is a relatively unambiguous model. The HMM gives a simple probabilistic finite-state machine model of full-body motor control.

Because the images are 2D projections, the system must infer how the body is oriented relative to the camera. To handle rotations of the body around the gravity axis, I replicate this HMM once for each view, re-estimate the output distributions of each view-specific HMM to cover an appropriately rotated version of the 3D data and its 2D projection. I link together all view-specific HMMs as follows. If $P_{i|j}$ is the probability of transitioning into state i from state j in the original HMM, and state i' is the $i^{th}$ equivalent state in a duplicated HMM observing data rotated by $\Phi$, then $P_{i'|j}=P_{i|j}V(\Phi; \sigma^2)$, where $V(\Phi; \sigma^2)$ is a circular von Mises density with small variance $^2$ estimated from data. The resulting Cartesian-product HMM has 1024 states, i.e., 32 for each view.

Note, this monocular 2D-to-3D architecture easily accommodates multiple views. For example, for cameras viewing at 0°, 15°, and 30°, each view-specific HMM hidden state observes the product of its own Gaussian, and those of equivalent states viewing 15°, and 30° beyond it. Similarly, other sources of evidence, e.g., feature tracking, can be exploited by estimating additional cue Gaussians on appropriately rotated projections as described above.

The method according to the invention infers 3D sequences that are action-for-action consistent with the video. The method correctly recovers the jump, twirl, and landing in the sequence of FIG. 9, but reconstructs the 3D with arms akimbo and a wide-legged landing, which is closer to the examples of turning observed in the training set. The figurine synthesized from the sequence of FIG. 10 reaches when the human reaches, puts its hands together when the human does, and walks as the human does.

Inferring 3D body pose from highly ambiguous image sequences, e.g., shadow-plays, requires extensive use of context to resolve ambiguities. According to my invention, the problem is framed as one of learning a mapping between histories (paths) rather than configurations (points). I estimate a basis for this mapping by learning a concise probabilistic model of the high-dimensional dynamical manifold of the 3D system. Entropy minimization yields extremely parsimonious and topologically accurate probabilistic models, making my approach viable even with very limited and atypical training data.

For 2D-to- 3D inference, I use translation- and scale-invariant moments as evidence and folded inference about rotations around the gravity axis into the learned model. The MAP solution for constrained geodesics through the learned density space yields the optimal target trajectory with respect to any sequence of evidence. The resulting system can infer qualitatively correct 3D action and orientation from low-resolution monocular shadow sequences with full turns and heavy occlusion, propagating information forwards and backwards through time over hundreds of frames to resolve multiple ambiguities per frame. The system makes no kinematic or rigidity assumptions, and the framework can trivially incorporate other sources of evidence including tracking and multiple cameras.

My learning-based inference method has the following advantages. It makes sense of highly ambiguous sensing with extensive use of hindsight and foresight, and it can incorporate any kind of evidence. It is fully trainable and makes no assumptions about jointedness, rigidity, or degrees of freedom in the target system. There are no singularities and the computational costs are fixed. My method is fully Bayesian, and becomes exact as entropy is minimized.

Finally, the results are guaranteed to be consistent with the configural and dynamical behavior in the training set.

While this invention has been described in terms of a preferred embodiment and various modifications thereof for several different applications, it will be apparent to persons of ordinary skill in this art, based on the foregoing description together with the drawing, that other modifications may also be made within the scope of this invention, particularly in view of the flexibility and adaptability of the invention whose actual scope is set forth in the following claims.

I claim:

1. A method for inferring a target path in a target system from a cue path comprises the steps of:
   learning a target state machine, target probability density functions and an occupancy matrix of the state machine from training target paths;
   learning cue probability density functions from synchronized training cue paths and the target occupancy matrix;
   analyzing a cue path using the cue probability density functions and the target state machine to produce a hidden state representation of the cue path, and
   synthesizing the target path from the hidden state representation of the cue path and the target probability density functions.

2. The method of claim 1 wherein the target state machine and the target probability density functions are represented as hidden Markov models.

3. The method of claim 2 wherein entropy in the hidden Markov models is minimized.

4. The method of claim 1 wherein the analysis uses a Viterbi procedure, and the hidden state representation is a sequence of hidden states.

5. The method of claim 1 wherein the analysis uses forward-backward analysis, and the hidden state representation is a cue occupancy matrix.

6. The method of claim 3 wherein three entropies are minimized as:

$$\theta^* = \operatorname{argmin}_{\theta} [H(\omega) + D(\omega\|\theta) + H(\theta)],$$

where $H(\theta)$ is an entropy of an expected sufficient statistics, $D(\omega\|\theta)$ is a cross-entropy entropy between the sufficient statistics and the hidden Markov model, and $H(\omega)$ is an entropy measure on the hidden Markov model.

7. The method of claim 1 wherein the target path is a three-dimensional sequence of images and the cue path is a two-dimensional sequence of images.

* * * * *